(12) United States Patent
Degener

(10) Patent No.: US 6,176,532 B1
(45) Date of Patent: Jan. 23, 2001

(54) FLUID POWERED GRIPPER ASSEMBLY HAVING CENTRAL CAVITY

(76) Inventor: Mark L. Degener, 6868 Crownridge, Rockford, IL (US) 61101

( * ) Notice: Under 35 U.S.C. 154(b), the term of this patent shall be extended for 0 days.

(21) Appl. No.: 09/332,487

(22) Filed: Jun. 14, 1999

(51) Int. Cl.$^7$ .................................................. B25J 15/08
(52) U.S. Cl. ................................ 294/88; 294/115; 901/37
(58) Field of Search ............................... 294/88, 115, 907; 269/27, 30, 32, 34; 901/37

(56) References Cited

U.S. PATENT DOCUMENTS

| | | | |
|---|---|---|---|
| 3,522,838 | 8/1970 | Ott ........................................ | 164/404 |
| 3,677,428 | 7/1972 | Mallett ................................. | 214/147 |
| 3,711,144 | 1/1973 | Briot ..................................... | 294/86 |
| 4,257,639 | * 3/1981 | Stock ..................................... | 294/88 |
| 4,509,783 | 4/1985 | Ionescu ................................. | 294/88 |
| 4,593,948 | 6/1986 | Borcea et al. ......................... | 294/88 |
| 4,650,235 | * 3/1987 | Shaginian et al. .................... | 294/88 |
| 4,667,998 | 5/1987 | Borcea et al. ......................... | 294/88 |
| 4,743,055 | 5/1988 | Dantan .................................. | 294/88 |
| 4,752,094 | 6/1988 | Tabeau .................................. | 294/88 |
| 4,776,199 | * 10/1988 | Schubert ............................... | 294/88 |
| 4,894,103 | 1/1990 | Bailey .................................... | 156/111 |
| 4,907,834 | 3/1990 | Dejong et al. ......................... | 294/88 |
| 5,509,707 | 4/1996 | Schauer ................................. | 294/86.4 |
| 5,836,633 | * 11/1998 | Svensson .............................. | 294/88 |
| 5,967,581 | * 10/1999 | Bertini ................................... | 294/88 |

FOREIGN PATENT DOCUMENTS 841-962 * 7/1981 (SU) ..................................... 901/37

* cited by examiner

*Primary Examiner*—Dean J. Kramer
(74) *Attorney, Agent, or Firm*—Leydig, Voit & Mayer, Ltd

(57) ABSTRACT

A fluid powered gripper assembly includes a central cavity between gripper arms for such things as receiving a sensor or receiving a tool to work the workpiece or for receiving a part for mounting to a top portion of a workpiece held between gripper arms. The fluid powered gripper assembly generally comprises a housing which includes a body defining a cylindrical piston chamber, a cover which encloses the piston chamber and a sleeve extending through the body and the cover to provide a through hole. The through hole extends through a first side of the cover and a second side of the body at a point generally intermediate the gripper arms. This provides access to the top side of the workpiece held between gripper arms or alternatively provides a mechanism for mounting a sensing unit intermediate the gripper arms for sensing a characteristic of the workpiece held between gripper arms. The gripper assembly includes a pneumatically powered piston mounted for reciprocation in the piston chamber. The piston has a central orifice to receive the sleeve therethrough. A pair or push rods mounted 180 degrees apart to balance the movement of the piston are connected to the piston and act on the gripper arms at a point offset from the pivot axis of the gripper arms for facilitating pivoting movement of the gripper arms.

18 Claims, 5 Drawing Sheets

FLUID POWERED GRIPPER ASSEMBLY HAVING CENTRAL CAVITY

FIELD OF THE INVENTION

The present invention generally relates to gripper assemblies for gripping and releasing a workpiece, and more particularly to fluid powered gripper assemblies.

BACKGROUND OF THE INVENTION

Gripper assemblies are used for handling and transporting parts, often in conjunction with automated pneumatically powered robotics type machinery. Examples of prior attempts at gripper assemblies are illustrated in Borcea et al., U.S. Pat. No. 4,667,998 and Borcea et al., U.S. Pat. No. 4,593,948. As is typical, the gripper assembly includes a housing and a plurality of arms (typically two or three arms) that are movable towards and away from each other relative to the body. The arms are typically either pivotably connected to the housing for pivoting movement about a pivot axis or slidably mounted for linear reciprocation towards and away from each other. An actuating mechanism, usually in the form of a pneumatically powered piston, is mounted in the housing for reciprocating the arms towards and away from each other.

Gripper assemblies are off-shelf-components that are selected for use in a wide range of machine applications. Gripper assemblies are preferably compact so to prevent interference with other moving parts in a working machine incorporating the gripper assembly. It is often desirable to perform work on the workpiece while the workpiece is being held between the arms of a gripper assembly. One problem with prior gripper assemblies in certain applications is that there is not a highly reliable method for determining whether a part is held and/or properly held by a gripper assembly. Yet another problem with prior gripper assemblies is that it has been relatively difficult to perform certain work on a workpiece held by a gripper assembly. It may be necessary to configure the machine utilizing the gripper assembly in a less desirable and/or more costly manner to accomplish the desired work.

SUMMARY OF THE INVENTION

It is therefore the main objective of the present invention to provide a more practical gripper assembly.

It is a specific object of the present invention to provide a gripper assembly that can be more easily adapted for machine applications.

It is therefore a feature of the present invention to provide a fluid powered gripper assembly with a cavity in the body between the gripper arms. The cavity allows the gripper assembly to be more readily adapted for a wider variety of applications. For example, the cavity may be used to house a proximity sensor which determines whether a workpiece is properly held between gripper arms. The cavity may also be used to provide clearance for receiving such things as the valve stem of a workpiece extending upwards into the housing.

According to an aspect of the present invention, the cavity is a through hole extending completely through two opposing sides of the housing. The through hole may be used to receive a proximity sensor or other sensor for communicating with a workpiece held between gripper arms. The through hole may alternatively be used for receiving a predetermined size part therethrough. The part can then be mounted to the top side of a workpiece while it is held between the gripper arms. The through hole may also alternatively be used for receiving a tool such as a screwdriver therethrough for working a top portion of a workpiece held between gripper arms. In any event, the actual application of the through hole will depend upon the use of the gripper assembly. It is an advantage that the through hole makes the gripper assembly much more adaptable for machine applications.

According to an embodiment of the present invention, a fluid powered gripper assembly comprises a housing which includes a body defining a cylindrical piston chamber, a cover which encloses the piston chamber and a sleeve extending through the body and the cover to provide a through hole extending through respective sides of the cover plate and body. A cylindrical piston is mounted for reciprocation in the piston chamber for movement along a linear axis. The piston receives the sleeve therethrough to accommodate the through hole while providing sufficient force to actuate the gripper arms. The gripper arms are drivingly connected to the piston through a linkage whereby the gripper arms pivot towards and away from each other about respective pivot axis. The piston receives power from pneumatic inlet and outlet ports disposed on the body and cover.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
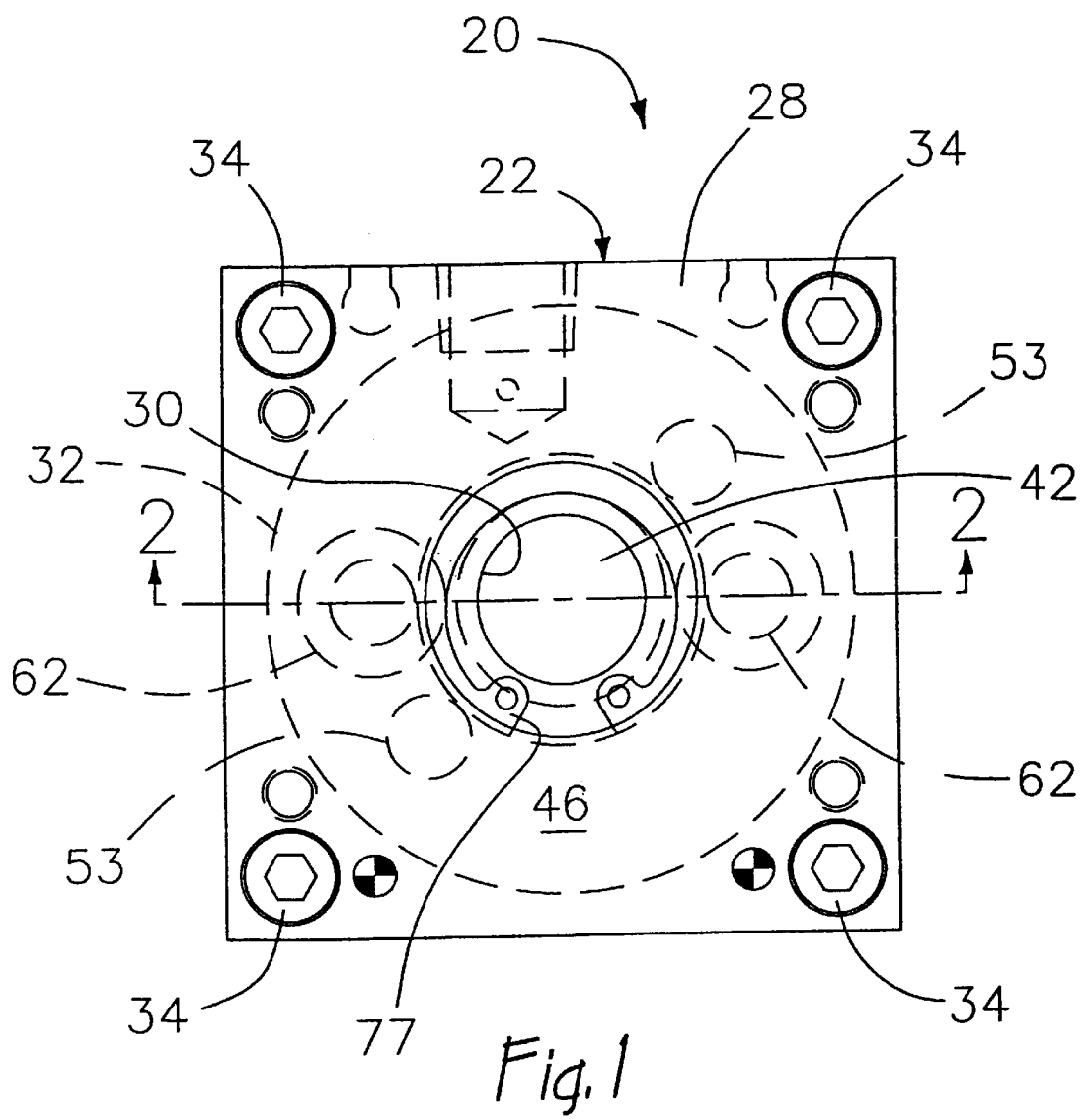
FIG. 1 is a plan view of a gripper assembly according to a preferred embodiment of the present invention.
Figure 2:
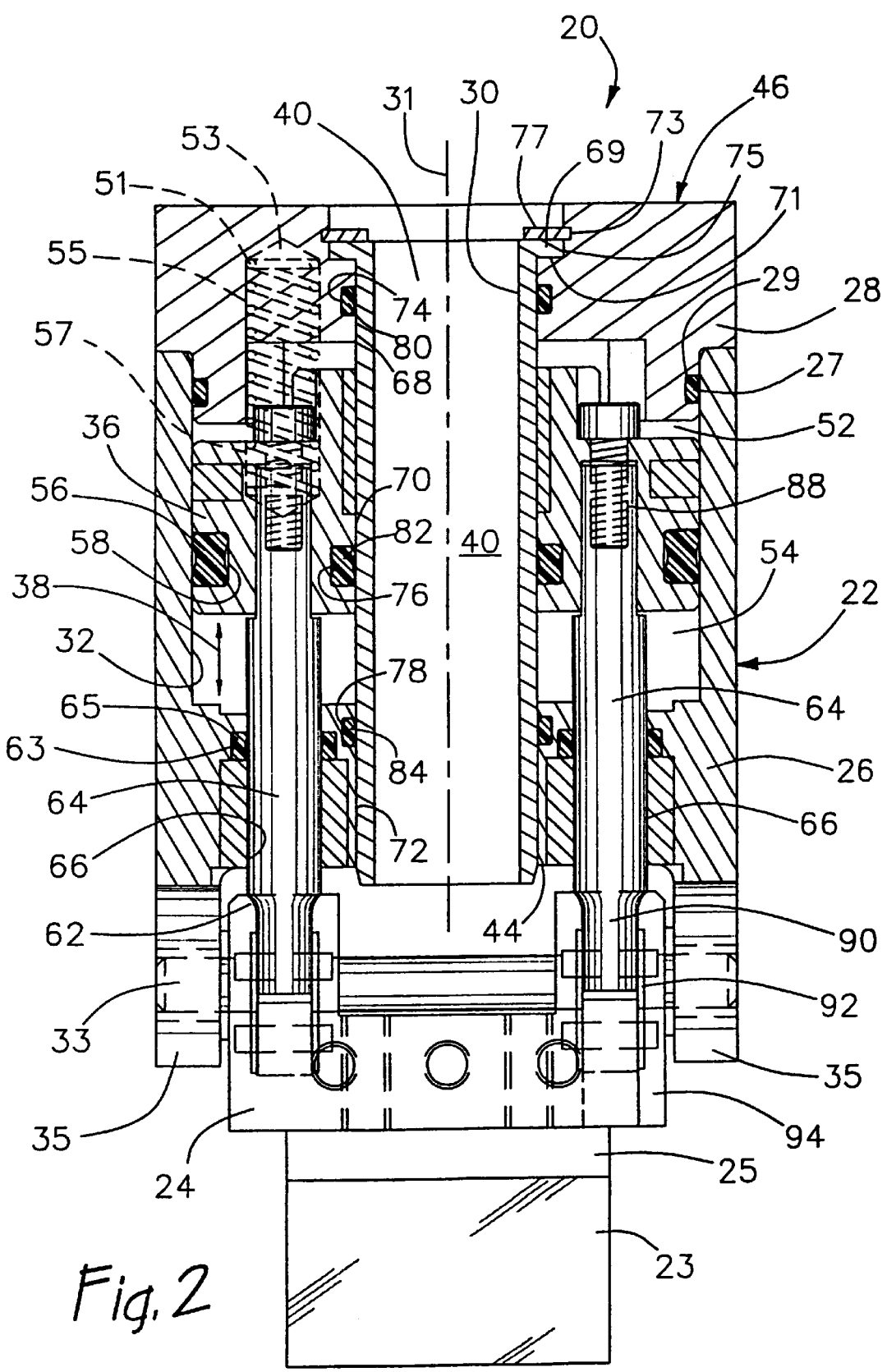
FIG. 2 is a cross-sectional view of FIG. 1 taken about line 2—2.
Figure 3:
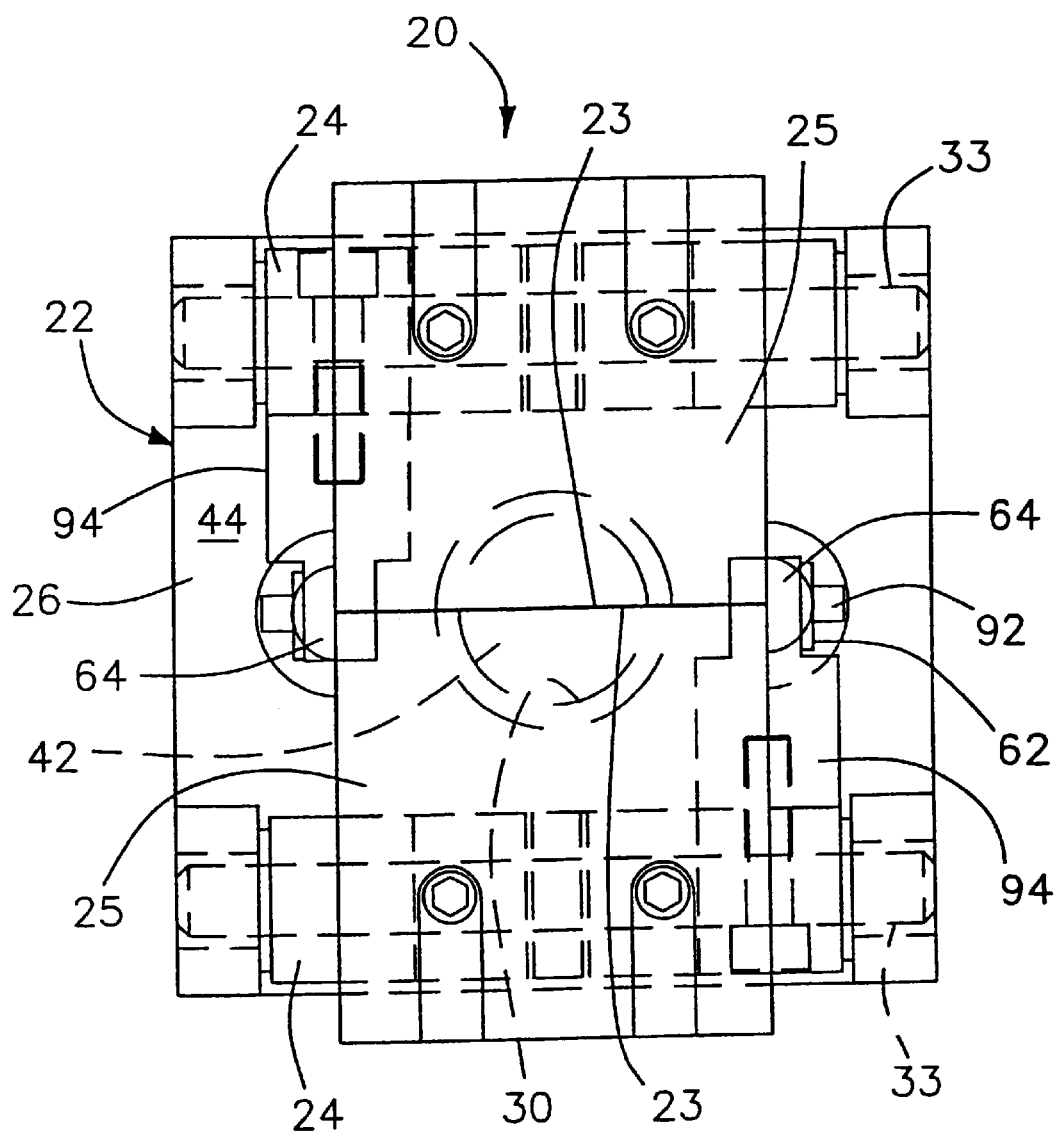
FIG. 3 is a bottom view of the gripper assembly illustrated in FIG. 1.
Figure 4:
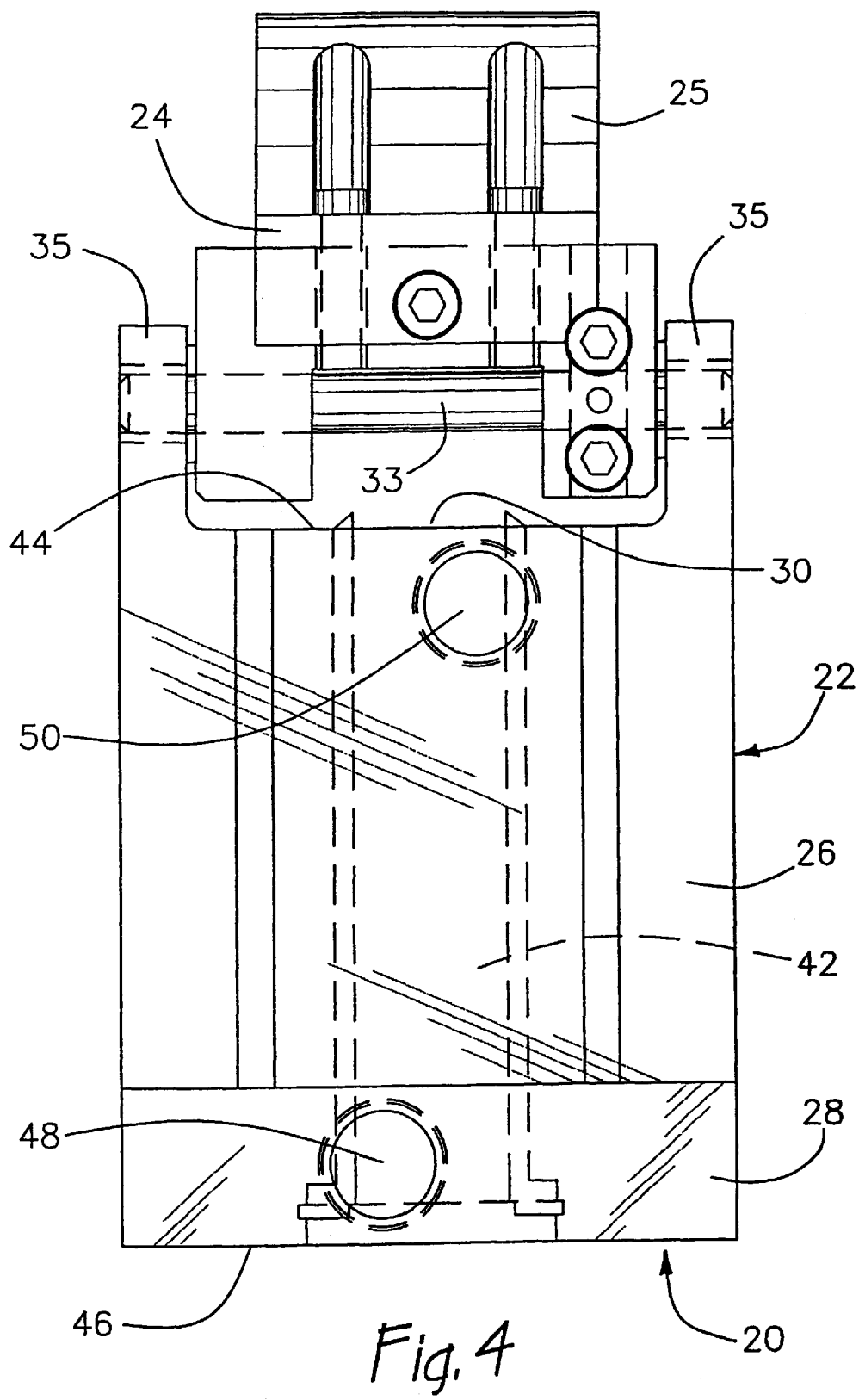
FIG. 4 is an inverted side view of the gripper assembly illustrated in FIG. 1.
Figure 5:
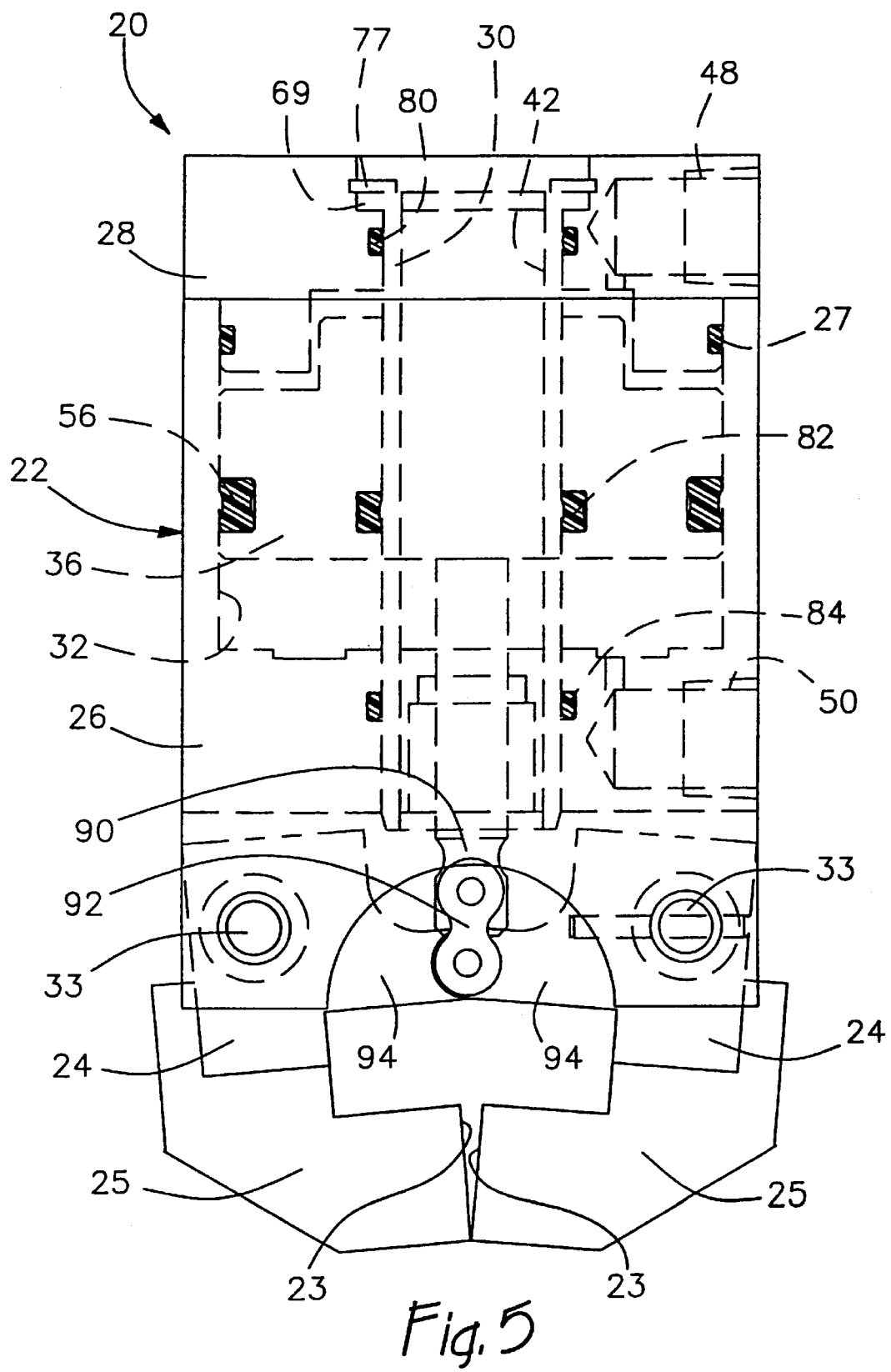
FIG. 5 is a side view of the gripper assembly illustrated in FIG. 1 with dotted lines showing the pivoting movement of the gripper arms.

Referring to FIGS. 1–3, the present invention is embodied in a pneumatic gripper assembly 20. The gripper assembly generally includes a housing 22 and multiple gripper arms 24 for opening and closing movement relative to the housing 22. In the preferred embodiment, two gripper arms 24 are shown but it will be understood that an alternative embodiment may include more gripper arms such as three gripper arms if so desired. As shown in FIG. 5, the gripper arms 24 are mounted for pivoting movement relative to the housing 22 with opposing workpiece engaging faces 23 of jaws 25 mounted to the arms 24 being movable generally toward and away from each other. Each arm 24 is pivotably connected by a pivot pin 33 to a housing mount 35 projecting outward from the bottom side of the housing 22. It will be appreciated to those skilled in the art that the gripper arms could alternatively be mounted for linear reciprocation toward and away from each other in an alternative embodiment. The jaws 25 may be provided with the assembly 20 or by the end user of the assembly 20 as desired. The jaws 25 can be machined by the end user as desired to meet the desired application needs.

In the preferred embodiment, the housing 22 generally comprises a body 26, a cover in the form of a cover plate 28 and a separate center sleeve 30. The center sleeve 30 may also be integrally formed with the body 26 and cover plate 28 in an alternative embodiment. The body 26 has a cylindrical piston chamber 32 that is generally coaxial about a center axis 31. The cover plate 28 is secured to the body 26 by fasteners 34 to enclose the piston chamber 32. A gasket 27 is seated in an outer peripheral groove 29 of the cover plate 28 and compressed between the cover plate 28 and the body 26 to provide a seal which prevents leakage of air from the piston chamber 32. For actuation of the gripper arms 24, the preferred embodiment includes a cylindrical piston 36 slidably mounted in the piston chamber 32. The cylindrical outer periphery of the piston 32 is closely adjacent the inner cylindrical periphery of the piston chamber 32. The cylindrical piston 36 is adapted to reciprocate linearly in the piston chamber 32 as indicated by line 38 as a result of a fluid pressure differential across the piston 36. To provide the fluid pressure differentials necessary for linear reciprocation of the piston 36, the housing includes two fluid inputs 48, 50, that are in fluid communication with upper and lower compartments 52, 54 of the piston chamber 32. The fluid inputs 48, 50 are connectable to an external pneumatic supply of compressed air to selectively receive pressurized air and to exhaust air such that the piston can be moved upwardly and downwardly as desired. One or more return springs 51 may also be mounted in one of the fluid compartments 52, 54 for assisting the movement of the piston 36 in one of the opening or closing directions. In the preferred embodiment two return springs 51 are mounted in respective spring chambers 53 (see FIGS. 1 and 2) that include a portion 55 defined by the cover plate 28 and a portion 57 defined by the piston 36 to urge the piston towards the open position in which the arms 24 and therefore the jaws 25 are forced further apart from each other. The springs 51 are mounted at spaced intervals at 180° and at an equal radial distance from the center of the surface area of the piston 36 such that the forces are balanced to facilitate smooth sliding movement of the piston 36. A heavy gauge spring may also be used as an alternative to one of the fluid inputs for returning piston to a non-pressurized position.

In accordance with an aspect of the present invention, the center sleeve 30 extends completely through the housing 22 and through the piston 36 to provide a through hole 42 or other form of cavity disposed between and generally intermediate the gripper arms 24. As shown and oriented in the figures, the through hole 42 extends through the bottom side 44 of the body 26 at a point in between the gripper arms 24 and through the top side 46 of the cover plate 28. Preferably, the center sleeve 30 is coaxial about the center axis 31 of the assembly.

The through hole 42 provides a more practical and adaptable gripper assembly 20 and as such has a predetermined size for the desired use of the through hole. As previously indicated, the gripper assembly 20 is intended to be an off-the-shelf component for use in various machines for many different types of applications. As such, the use of the through-hole depends upon the desired application of the gripper assembly 20. Some of the envisioned uses for the through hole 42 are for mounting a proximity sensor or other sensor for sensing whether or not a workpiece is held between gripper arms 24 or whether or not a workpiece is properly held between gripper arms 24. To mount a sensor, a portion of the internal surface of the sleeve 30 may be threaded if desired. Another envisioned use of the through hole 42 is in conjunction with a tooling station. Specifically, a part or other item may be inserted through the through hole 42 for affixation or fastening to the top side of the workpiece that faces the bottom side 44 of the body. The top side of the workpiece would otherwise be unreachable or hard to reach without the through hole. Similarly, a tool such as a screw driver may be inserted through the through hole 42 to work the top side of a workpiece held between the gripper arms 24.

Although the through-hole extends completely through two sides of the housing 22 in the preferred embodiment, certain broader claims appended hereto are meant to include other types of cavities which extends upward only through the bottom side 44 of the housing 22. Although such a cavity would not allow for tool station applications, the cavity could receive a sensor or otherwise provide clearance for a projecting structure from the workpiece such as a valve stem for example.

To facilitate mounting of the sleeve 30, the cover plate 28, the piston 36 and the body 26 each have diametrically aligned cylindrical openings 68, 70, 72 that are aligned coaxial about the center axis 31 to closely receive the cylindrical periphery 7 of the sleeve 30. The center sleeve 30 closely fits through each of the openings 68, 70, 72. The sleeve 30 includes a rim or shoulder portion 69 at its end that projects outward from the cylindrical periphery 70 and seats against seating surface provide by the radially planar base of a counter bore or enlarged diameter recess 71 in the side of the housing 22. A retaining groove 73 formed in the outer wall 75 of the recess 71 receives a retaining ring 77 which axially retains the shoulder portion 69 of the sleeve against the seating surface of the recess 71.

To prevent fluid leakage which could cause displacement of the piston 36, seals are provided between the sleeve 30 and the cover plate 28, the piston 36 and the body 26. Specifically, the cover plate 28 includes an inner annular groove 74 in the cylindrical wall of the opening 68 that receives a ring gasket 80. The gasket 80 is compressed between the sleeve 30 and the cover plate 28 to prevent leakage of air from the upper piston chamber compartment 52 to the external atmosphere. Similarly, the piston 36 includes an inner annular groove 76 in the cylindrical wall of the opening 70 that receives a ring gasket 82. The gasket 82 is compressed between the sleeve 30 and the piston 36 to prevent leakage of air between the upper and lower piston chamber compartments 52, 54. Likewise, the body 26 includes an inner annular groove 78 in the cylindrical wall of the opening 72 that receives a ring gasket 84. The ring gasket 84 is compressed between the body 26 and the sleeve 30 to prevent leakage of air from the lower piston chamber compartment 54 to the external atmosphere. To prevent air from seeping past the piston 36 between the upper and lower compartments 52, 54, there is also provided an outer gasket 56 seated in a groove 58 in the outer cylindrical periphery of the piston 36. The gasket 56 is compressed between the piston 36 and the body 26 to prevent leakage between compartments 52, 54.

In accordance with an aspect of the present invention, the central opening 70 of the piston 36 allows the center sleeve 30 to extend through the piston 36. One advantage of this configuration is that the gripper assembly can be compact which is a desired feature for many machine applications. Another advantage is that the piston 36 can be mounted central to the gripper arms 24 where it can easily apply an equal force to each arm 24. Preferably the sleeve 30 and the piston 36 are coaxial so that the center of the surface area of the faces of the piston 36 coincide with the center axis 31 of the assembly 20. This ensures a proper balance of pneumatic forces to minimize wear between closely adjacent components of the assembly 20 during reciprocation of the piston 36.

To drivingly connect the piston 36 to the gripper arms 24, a pair of push rod assemblies 62 are provided. Each push rod assembly 62 includes a shaft 64 which extends through a formed bore 66 or other cylindrical opening in the body 26. A ring gasket 63 is seated in a groove 65 in the cylindrical wall of the bore 66 to prevent fluid escape from the lower piston chamber compartment 54 to the external atmosphere. Each shaft 64 has one end 88 connected by a small screw or otherwise secured to the cylindrical piston 36 and the other end 90 acting on one of the gripper arms 24 at a point offset from the pivot axis provided by the pivot pins 33 upon which the gripper arms 24 pivot. The shafts 64 are connected to the piston 36 at spaced intervals at 180° and at an equal radial distances from the center of the surface area of the piston 36 such that the forces are balanced to facilitate smooth sliding movement of the piston 36. The bottom end 90 of each shaft 64 is connected by pins through a pivot link 92 to a lever extension 94 of the gripper arm 24.

All of the references cited herein, including patents, patent applications and publications are hereby incorporated in their entireties by reference. While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A fluid-powered gripper assembly, comprising a housing having an internal piston chamber therein and at least one fluid input port in fluid communication with the piston chamber, a piston slidably mounted in the piston chamber for reciprocating movement therein, the piston having an opening, at least two gripper arms carried by the housing drivingly connected to the piston, the gripper arms being movable towards and away from each other in response to reciprocating movement of the piston, the housing further including a sleeve portion fixed relative to the body extending through the piston chamber and through the opening in the piston, the sleeve portion providing a through hole extending through two ends of the housing.

2. The gripper assembly of claim 1 wherein the through hole has a predetermined size dimensioned to receive a sensor for communicating with a workpiece held between griper arms.

3. The gripper assembly of claim 1 wherein the through hole has a predetermined size dimensioned to receive a predetermined sized part therethrough for mounting to a top portion of a workpiece held between gripper arms.

4. The gripper assembly of claim 1 wherein the through hole has a predetermined sized dimensioned to receive a predetermined sized tool therethrough for working a top portion of a workepiece held between gripper arms.

5. The gripper assembly of claim 1 wherein the piston is cylindrical and the opening in the piston is coaxial with the cylindrical periphery of the piston.

6. The gripper assembly of claim 1 further comprising a plurality of push rods, one for each gripper arm, the gripper arms being mounted for pivoting movement relative to the housing about respective pivot axes, each push rod having one end connected to the piston and another end acting on the gripper arm at a point offset from the pivot axis.

7. The gripper assembly of claim 1 further comprising a seal disposed between the sleeve portion and the piston preventing fluid leakage between upper and lower compartments of the piston chamber.

8. The gripper assembly of claim 1 further comprising at least one spring mounted in the piston chamber biasing the piston in one direction.

9. A pneumatic gripper assembly, comprising:
a body providing a cylindrical piston chamber;
a cover mounted to the body enclosing the piston chamber;
a sleeve fixed relative to the body and extending through the body and the cover to provide a through-hole extending through sides of the cover and the body;
a cylindrical piston mounted for reciprocation in the piston chamber for movement along an axis, the piston having an opening receiving the sleeve therethrough;
a pair of gripper arms drivingly connected to the piston, each gripper arm being pivotably connected to the housing for pivoting movement about a pivot axis in response to reciprocation of the piston, the through-hole being located between the gripper arms; and
first and second fluid inputs in communication with the piston chamber at locations above and below the piston, respectively.

10. The gripper assembly of claim 9 further comprising a first seal between the sleeve and the cover, a second seal between the sleeve and the piston, and a third seal between the sleeve and the body, the seals preventing fluid leakage along the outer periphery of the sleeve.

11. The gripper assembly of claim 9 further comprising a pair of push rods, each push rod being connected to the piston and acting on at least one of the gripper arms at point offset from the pivot axis for facilitating pivoting movement of the gripper arms.

12. A pneumatic gripper assembly, comprising:
a body providing a cylindrical piston chamber and having a first opening extending through a side of the body;
a cover mounted to the body enclosing the piston chamber and having a second opening extending through a side of the cover;
a cylindrical piston mounted for reciprocation in the piston chamber for movement along an axis, the piston having a third opening diametrically aligned with the first and second openings;
a cylindrical sleeve closely mounted through the diametrically aligned openings and secured to at least one of the body and the cover such that the sleeve is fixed relative to the body, the sleeve providing a through-hole extending through the sides of the cover and the body;
a pair of gripper arms drivingly connected to the piston, each gripper arm being pivotably connected to the housing for pivoting movement about a pivot axis in response to reciprocation of the piston, the through-hole being located between the gripper arms; and
first and second fluid inputs in communication with the piston chamber at locations above and below the piston, respectively.

13. The gripper assembly of claim 12 further comprising a recess in the cover surrounding the second opening, the sleeve including a shoulder portion projecting outward from the outer cylindrical periphery of the sleeve and seated in the recess, and further comprising a retaining ring depending on the cover and axially retaining the shoulder portion against the surface of the recess.

14. The gripper assembly of claim 12 further comprising a first seal between the sleeve and the cover, a second seal between the sleeve and the piston, and a third seal between the sleeve and the body, the seals preventing fluid leakage along the outer periphery of the sleeve.

15. The gripper assembly of claim 14 wherein the first, second, and third seals are provided by ring gaskets, each ring gasket being seated in a groove in the wall of one of the openings.

16. The gripper assembly of claim 12 further comprising a pair of push rods, each push rod being connected to the piston and acting on at least one of the gripper arms at point offset from the pivot axis for facilitating pivoting movement of the gripper arms.

17. The gripper assembly of claim 16 wherein the push rods are located at an equal radial distance from said axis and spaced apart at 180°.

18. The gripper assembly of claim 17 wherein the piston, the openings, the sleeve and the through-hole are coaxial.

* * * * *